(12) United States Patent
Fleureau et al.

(10) Patent No.: US 12,249,107 B2
(45) Date of Patent: Mar. 11, 2025

(54) METHOD AND APPARATUS FOR ENCODING AND DECODING THREE-DIMENSIONAL SCENES IN AND FROM A DATA STREAM

(71) Applicant: InterDigital VC Holdings, Inc., Wilmington, DE (US)

(72) Inventors: Julien Fleureau, Cesson-Sevigne (FR); Renaud Dore, Cesson-Sevigne (FR); Franck Thudor, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 18/201,013

(22) Filed: May 23, 2023

(65) Prior Publication Data

US 2023/0351641 A1 Nov. 2, 2023

Related U.S. Application Data

(63) Continuation of application No. 16/962,393, filed as application No. PCT/US2019/013422 on Jan. 14, 2019, now Pat. No. 11,790,562.

(30) Foreign Application Priority Data

Jan. 19, 2018 (EP) ..................... 18305043

(51) Int. Cl.
*G06T 9/00* (2006.01)
*G06T 3/40* (2006.01)
(Continued)

(52) U.S. Cl.
CPC ............. *G06T 9/001* (2013.01); *G06T 3/40* (2013.01); *G06T 17/20* (2013.01); *H04L 65/70* (2022.05); *H04L 65/75* (2022.05)

(58) Field of Classification Search
None
See application file for complete search history.

(56) References Cited

U.S. PATENT DOCUMENTS 5,379,371 A 1/1995 Usami et al.
8,854,366 B1 10/2014 Simkins, Jr. et al.
(Continued)

FOREIGN PATENT DOCUMENTS

| CN | 102982560 A | 3/2013 |
|---|---|---|
| CN | 106570934 A | 4/2017 |

(Continued)

OTHER PUBLICATIONS

Anderson, et al., "Depth Buffer Compression for Stochastic Motion Blur Rasterization", High Performance Graphics, Vancouver, British Columbia, Canada, Aug. 5, 2011, pp. 127-134.

(Continued)

*Primary Examiner* — Sultana M Zalalee
(74) *Attorney, Agent, or Firm* — Condo Roccia Koptiw LLP

(57) ABSTRACT

Methods and devices are provided to encode and decode a data stream carrying data representative of a three-dimensional scene, the data stream comprising color pictures packed in a color image; depth pictures packed in a depth image; and a set of patch data items comprising de-projection data; data for retrieving a color picture in the color image and geometry data. Two types of geometry data are possible. The first type of data describes how to retrieve a depth picture in the depth image. The second type of data comprises an identifier of a parametric function and a list of parameter values for the identified parametric function.

14 Claims, 5 Drawing Sheets

(51) Int. Cl.
*G06T 17/20* (2006.01)
*H04L 65/70* (2022.01)
*H04L 65/75* (2022.01)

(56) References Cited

U.S. PATENT DOCUMENTS

| | | | |
|---|---|---|---|
| 11,375,235 B2 | 6/2022 | Fleureau et al. | |
| 11,790,562 B2* | 10/2023 | Fleureau | G06T 17/20 |
| | | | 382/232 |
| 2008/0143714 A1 | 6/2008 | Huang et al. | |
| 2011/0175911 A1 | 7/2011 | Loop et al. | |
| 2011/0286530 A1 | 11/2011 | Tian et al. | |
| 2013/0107010 A1 | 5/2013 | Hoiem et al. | |
| 2014/0063024 A1 | 3/2014 | Zhang et al. | |
| 2014/0092439 A1* | 4/2014 | Krig | H04N 13/161 |
| | | | 348/43 |
| 2014/0313290 A1 | 10/2014 | Tech et al. | |
| 2015/0245063 A1 | 8/2015 | Rusanovskyy et al. | |
| 2015/0279098 A1 | 10/2015 | Kim et al. | |
| 2016/0035324 A1 | 2/2016 | Morphet | |
| 2017/0163980 A1 | 6/2017 | Hirabayashi et al. | |
| 2017/0347055 A1 | 11/2017 | Dore et al. | |
| 2018/0053324 A1 | 2/2018 | Cohen et al. | |
| 2018/0225871 A1 | 8/2018 | Suresh et al. | |
| 2018/0350134 A1 | 12/2018 | Lodato et al. | |
| 2019/0042832 A1 | 2/2019 | Venshtain | |
| 2019/0045157 A1 | 2/2019 | Venshtain et al. | |
| 2019/0058857 A1 | 2/2019 | Bishop et al. | |
| 2019/0087979 A1 | 3/2019 | Mammou et al. | |
| 2019/0114815 A1 | 4/2019 | Erhard | |
| 2019/0156520 A1 | 5/2019 | Mammou et al. | |
| 2019/0313081 A1 | 10/2019 | Oh | |
| 2020/0013168 A1 | 1/2020 | Seshita et al. | |
| 2020/0228836 A1 | 7/2020 | Schwarz et al. | |
| 2020/0344493 A1 | 10/2020 | Fleureau et al. | |

FOREIGN PATENT DOCUMENTS

| | | |
|---|---|---|
| CN | 107074259 A | 8/2017 |
| CN | 111742548 A | 10/2020 |
| EP | 3249922 A1 | 11/2017 |
| WO | 2016003340 A1 | 1/2016 |

OTHER PUBLICATIONS

Jylanki, Jukka, "A Thousand Ways to Pack the Bin—A Practical Approach to Two-Dimensional Rectangle Bin Packing", Available at <https://core.ac.uk/display/103387426>, Feb. 27, 2010, 50 pages.

Liu, et al., "Three-Dimensional Point-Cloud Plus Patches: Towards Model-Based Image Coding in the Cloud", IEEE International Conference on Multimedia Big Data, Beijing, China, Apr. 20, 2015, pp. 395-400.

Quek, et al., "Comparison of Bicubic and Bezier Polynomials for Surface Parameterization in Volumetric Images", Third IEEE Symposium on BioInformatics and BioEngineering, Bethesda, Maryland, USA, Mar. 12, 2003, 8 pages.

* cited by examiner

METHOD AND APPARATUS FOR ENCODING AND DECODING THREE-DIMENSIONAL SCENES IN AND FROM A DATA STREAM

CROSS REFERENCE TO RELATED APPLICATIONS

This application is a continuation of U.S. patent application Ser. No. 16/962,393, filed Jul. 15, 2020, which is the National Stage Entry under 35 U.S.C. § 371 of Patent Cooperation Treaty Application No. PCT/US2019/013422, filed Jan. 14, 2019, which was published in accordance with PCT Article 21(2) on Jul. 25, 2019, in English, and which claims the benefit of European Patent Application No. 18305043.4, filed Jan. 19, 2018.

TECHNICAL FIELD

The present principles generally relate to coding and decoding of a three-dimensional (3D) scene or a sequence of three-dimensional scenes in and from a data stream. Particularly, but not exclusively, the technical field of the present principles is related to encoding/decoding of color images for the textures and depth images or analytic parameters for the geometry of the scenes.

BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

Immersive video, also called 360° flat video, allows the user to watch all around himself through rotations of his head around a still point of view. Rotations only allow a 3 Degrees of Freedom (3DoF) experience. Even if 3DoF video is sufficient for a first omnidirectional video experience, for example using a Head-Mounted Display device (HMD), 3DoF video may quickly become frustrating for the viewer who would expect more freedom, for example by experiencing parallax. In addition, 3DoF may also induce dizziness because of a user never only rotates his head but also translates his head in three directions, translations which are not reproduced in 3DoF video experiences.

Volumetric video (also known as 6 Degrees of Freedom (6DoF) video) is an alternative to 3DoF video. When watching a 6DoF video, in addition to rotations, the user can also translate his head, and even his body, within the watched content and experience parallax and even volumes. Such videos considerably increase the feeling of immersion and the perception of the scene depth and also prevent from dizziness by providing consistent visual feedback during head translations. The content is created by the means of dedicated sensors allowing the simultaneous recording of color and depth of the scene of interest. The use of rig of color cameras combined with photogrammetry techniques is a common way to perform such a recording.

A volumetric video is a sequence of 3D scenes. A solution to encode volumetric videos is to project each 3D scene of the sequence of 3D scene onto projection maps which are clustered in color pictures and depth pictures, called patches. Patches are packed in color and depth images which are stored in the video track of a video stream. This encoding has the advantage to make use of standard image and video processing standards. At the decoding, pixels of the color pictures are de-projected at a depth determined by information stored in the associated depth picture. Such solutions are effective. However, encoding this huge amount of data as images in the video track of a video stream raises problems. The size of the bit stream induces bitrate technical issues regarding storage space, transmission over a network and decoding performances.

SUMMARY

The following presents a simplified summary of the present principles to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles relate a method of encoding a 3D scene in a stream. The present disclosure relates to a method of encoding a three-dimensional scene in a stream. The method comprises:
  obtaining a set of patches, a patch comprising:
    de-projection data;
    a color picture; and
    a geometry data of a geometry type belonging to a set of two geometry types; a geometry data of a first geometry type comprising a depth picture; and a geometry data of a second geometry type comprising an identifier of a parametric function and a list of parameter values for the identified parametric function;
  generating a color image by packing color pictures of said patches and storing a color data in corresponding patch, the color data comprising a description of a location of the color picture of said patch as packed in the color image;
  generating a depth image by packing depth pictures of patches having a geometry data of the first geometry type and replacing the depth picture in the geometry data of corresponding patch by a description of a location of the depth picture of said patch as packed in the depth image;
  encoding in the stream:
    the generated color image;
    the generated depth image;
    a set of patch data items, a patch data item comprising the de-projection data of a patch, the color data of said patch and the geometry data of said patch.

The present disclosure also relates to a device adapted to encode a three-dimensional scene in a stream. The device comprises a memory associated with a processor configured to execute the present method of encoding a three-dimensional scene in a stream.

The present disclosure also relates to a method of decoding a three-dimensional scene from a data stream. The method comprises:
  obtaining from said data stream:
    a color image comprising color pictures packed in said colored image;
    a depth image comprising depth pictures packed in said depth image; and a set of patch data items, a patch data item comprising:
de-projection data;
a color data comprising a description of a location of a color picture in the color image; and
a geometry data of a geometry type belonging to a set of two geometry types; a geometry data of a first geometry type comprising a description of a location of a depth picture in the depth image; and a geometry data of a second geometry type comprising an identifier of a parametric function and a list of parameter values for the identified parametric function;

for a patch data item of said set:
if the geometry data is of the first geometry type, using de-projection data for de-projecting pixels of the color picture described by the color data at a depth value determined according to pixels of the depth picture described by the geometry data;
if the geometry data is of the second geometry type, using de-projection data for de-projecting pixels of the color picture described by the color data at a depth value determined by the parametric function of the geometry data, said parametric initialized with said list of parameter values The present disclosure also relates to a device adapted to decode a three-dimensional scene from a data stream. The device comprises a memory associated with a processor configured to execute the present method of decoding a three-dimensional scene from a data stream.

The present disclosure also relates to a data stream carrying data representative of a three-dimensional scene. The data stream comprises:
at least a color image comprising color pictures packed in said color image;
at least a depth image comprising depth pictures packed in said depth image, a depth image being associated with a first color image; and
a set of patch data items associated with said first color image, a patch data item comprising:
de-projection data;
a color data comprising a description of a location of a color picture in the first color image; and
a geometry data of a geometry type belonging to a set of two geometry types; a geometry data of a first geometry type comprising a description of a location of a depth picture in the depth image associated with the first color image; and a geometry data of a second geometry type comprising an identifier of a parametric function and a list of parameter values for the identified parametric function.

BRIEF DESCRIPTION OF DRAWINGS

The present disclosure will be better understood, and other specific features and advantages will emerge upon reading the following description, the description making reference to the annexed drawings wherein.

DETAILED DESCRIPTION OF EMBODIMENTS

Figure 1:
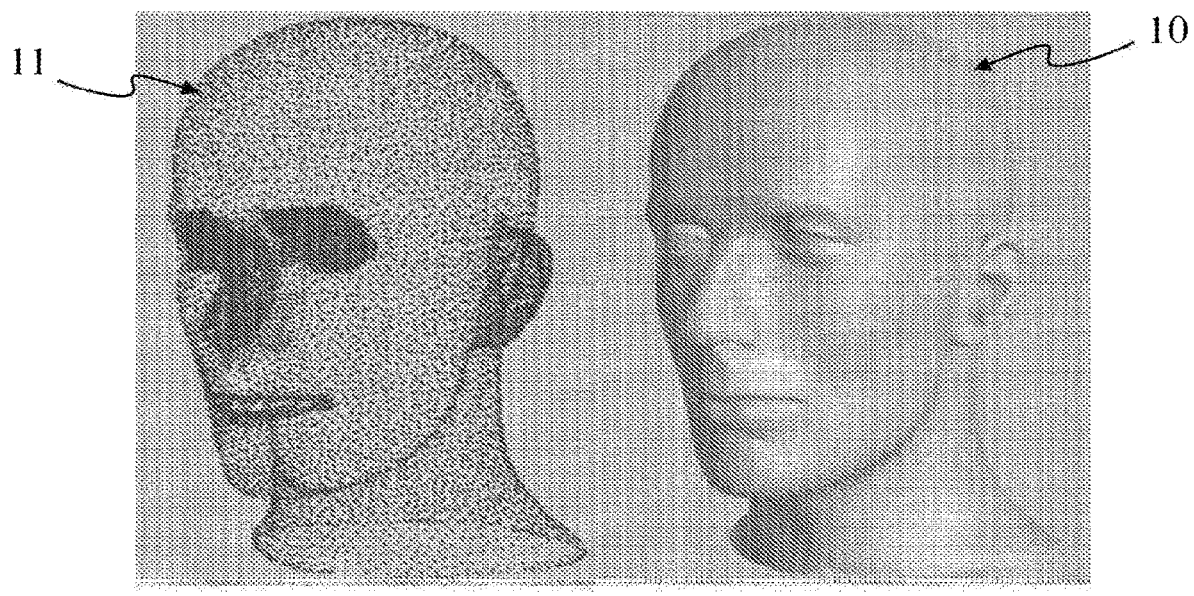
FIG. 1 shows a three-dimension (3D) model of an object and a points of a point cloud corresponding to the 3D model, according to a non-restrictive embodiment of the present principles.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims. While not explicitly described, the present examples and variants may be employed in any combination or sub-combination.

The present principles are described for encoding/decoding a three-dimensional (3D) scene or a sequence of three-dimensional scenes in and from a data stream.

FIG. 1 shows a three-dimension (3D) model of an object 10 and a points of a point cloud 11 corresponding to 3D model 10. Model 10 may be a 3D mesh representation and points of point cloud 11 may be the vertices of the mesh. Points 11 may also be points spread on the surface of the faces of the mesh. Model 10 may also be represented as a splatted version of point of cloud 11; that is the surface of model 10 is created by splatting the point of point of cloud 11. Model 10 may also be represented by many different representations such as voxels or splines. FIG. 1 illustrates that it is always possible to define a point cloud from a surface representation of a 3D object. Reciprocally it is always possible to create a surface representation of a 3D object from a point of cloud. As used herein, projecting points of a 3D object (by extension points of a 3D scene) to an image is equivalent to projecting any representation of this 3D object onto an image.

Figure 2:
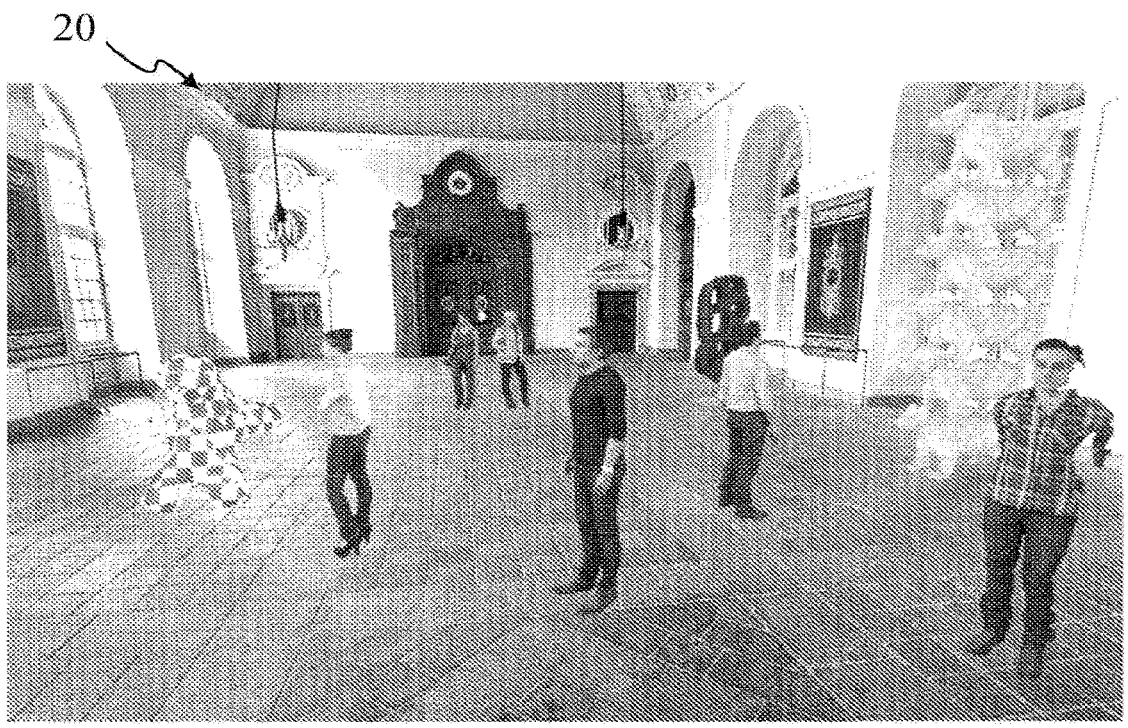
FIG. 2 shows an image representing a three-dimension scene comprising a surface representation of several objects captured as a point cloud, according to a non-restrictive embodiment of the present principles.

FIG. 2 shows an image 20 representing a three-dimension scene comprising a surface representation of several objects captured as a point cloud. The image 20 is generated from a point of view different of the acquisition point of view. For example, the character at the right of the image 20 is not complete, points of his left arm and his back are not available (e.g. they have not been captured) to fulfill the surface representation. The 3D scene may comprise different types of representation. For example, characters in the scene are represented as point clouds while statues are represented as textured meshes. A 3D scene is always rendered from a point of view. All points of the scene are not visible from the point of view, some parts of the scene are occulted by visible parts. A viewer of a volumetric video may move within the 3D scene in an area defining a set of possible points of view. Every point of the 3D scene visible from this set of possible points of view has to be encoded.

Figure 3:
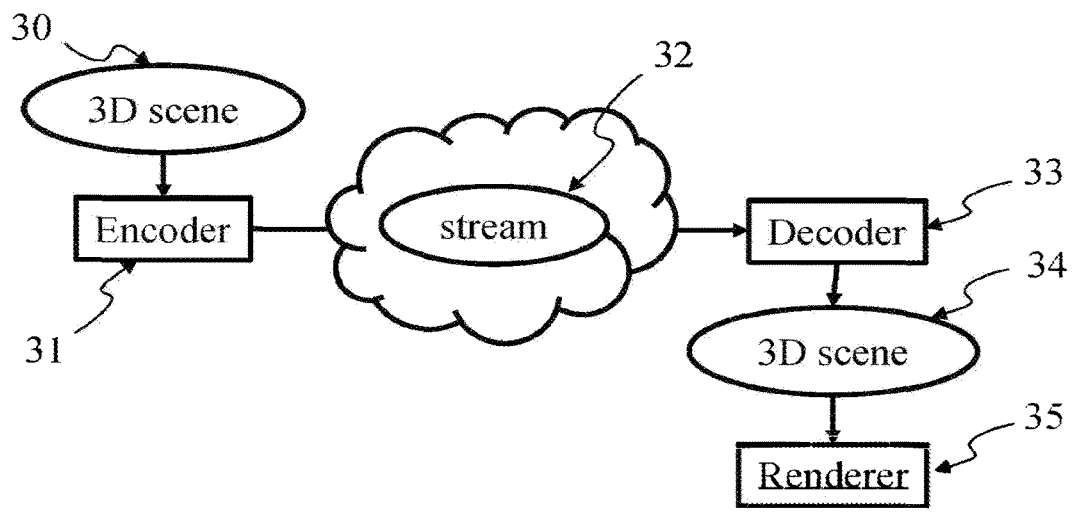
FIG. 3 illustrates an example of the encoding, transmission and decoding of a sequence of 3D scenes, according to a non-restrictive embodiment of the present principles.

FIG. 3 illustrates an example of the encoding, transmission and decoding of a sequence of 3D scenes. A sequence of at least 3D scene 30 is encoded in a stream 32 by an encoder 31 according to the principles of the present encoding method. A decoder 33 obtains stream 32 from a source. For example, the source belongs to a set comprising:
- a local memory, e.g. a video memory or a RAM (or Random Access Memory), a flash memory, a ROM (or Read Only Memory), a hard disk;
- a storage interface, e.g. an interface with a mass storage, a RAM, a flash memory, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth® interface); and
- a user interface such as a Graphical User Interface enabling a user to input data.

Decoder 33 decodes a sequence of 3D scenes 34 from stream 32 according to the present decoding method. According to the present principles, sequence of 3D scene 34 is as similar to sequence of 3D scenes 30 as possible. Sequence of 3D scenes 34 may be obtained from a source by a rendered 35. Renderer 35 computes images to be displayed for a 6DoF video viewing experience.

According to the present principles, pictures are obtained by projecting points of the 3D scene onto projection maps according to a projection mapping. Many projection mappings may be used to generate patches such as equirectangular mapping, cube mapping, pyramidal mapping or orthonormal mapping. A patch comprises:
- a color picture resulting of the projection of the textures onto a projection map,
- a depth picture storing the geometry information, i.e. the distance between points of the scene and the projection map; and
- de-projection data that are data allowing to retrieve the part of the scene encoded in the two pictures. De-projection data are used by the decoder to de-project the color pixels of the color picture in the 3D space at a depth determined by the pixel values of the depth picture.

Figure 4:
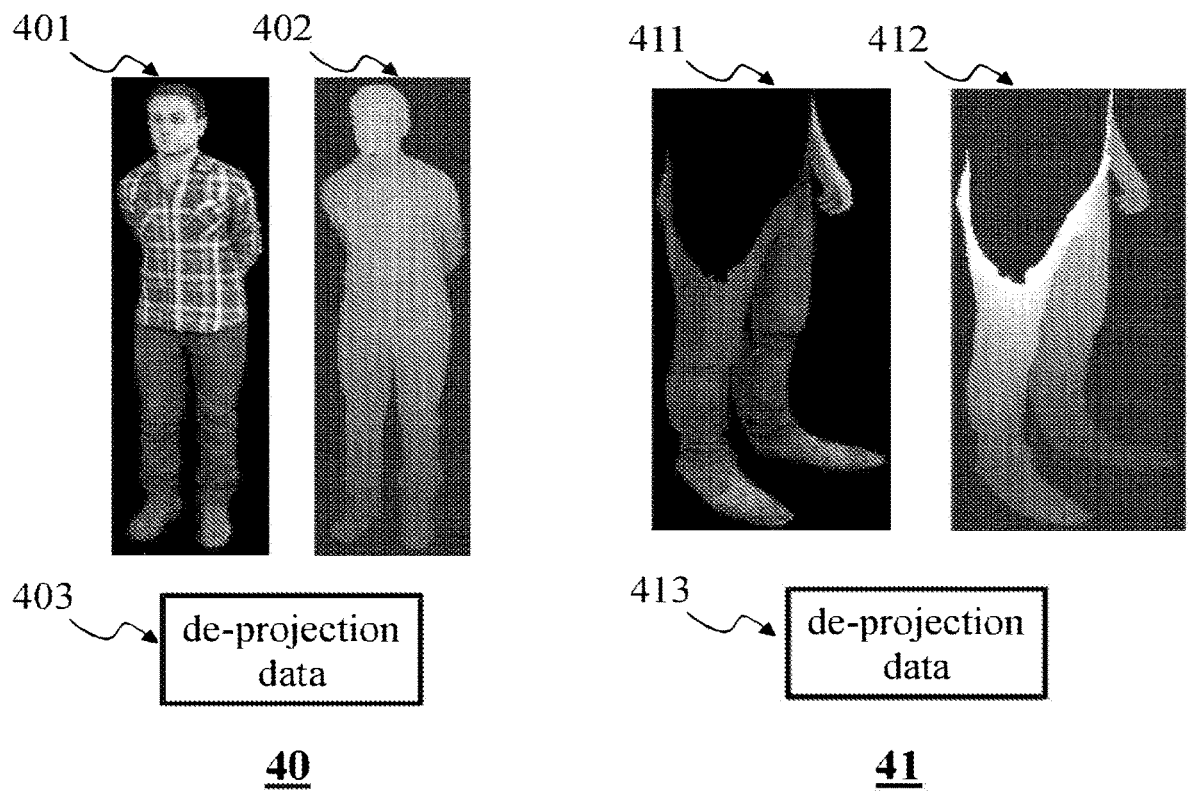
FIG. 4 illustrates two patches relative to the 3D scene of FIG. 2, each patch comprising a color picture, a depth picture and de-projection data, according to a non-restrictive embodiment of the present principles.

FIG. 4 illustrates two patches relative to the 3D scene of FIG. 2, each patch comprising a color picture, a depth picture and de-projection data. Different projection process may be used to generate patches. For example, the patches may be generated by a peeling projection process. Another possibility is to use octrees of cube mapping projections. Any suitable projection process may be used to generate a patch. A projection process suitable for the present principles generates a set of patches, patches comprising a color picture, a depth picture (or a unique picture storing both pixel data) and de-projection data to allow the decoder to decode the three-dimensional scene from the two pictures. In the example of an equirectangular projection mapping, de-projection data may comprise coordinates of the center of projection, the solid angle in the frame of reference that the patch correspond to (e.g. [$\theta_{min}, \theta_{max}$], [$\varphi_{min}, \varphi_{max}$]) and a range of depth value used for encoding the depth in the depth picture. Every data needed for de-projecting the information stored in the two pictures by the projection process is comprised in the de-projection data. These data allow the decoder to retrieve the 3D coordinates and the color of points projected in the two projection maps. On the example of FIG. 4, a patch 40 is generated comprising a color picture 401, a depth picture 402 and a set of de-projection data 403. This patch encodes data representative of the front side of one of the characters of the 3D scene of FIG. 2. Color picture 401 is the result of the projections of points of this part of the scene on a plane localized in the 3D space of the scene. Pixels of depth picture 402 stores the distances of between this plane and this part of the 3D scene. On the example of FIG. 4, the brighter the depth pixel, the closer to the plane the point of the scene. A black depth pixel means there is no color information at these coordinates in the color picture. A second example of patch 41 is provided on FIG. 4. Patch 41 corresponds to a part of a second character of the 3D scene of FIG. 2. Patch 41 comprises a color picture 411, a depth picture 412 and de-projection data 413. De-projection data 413 are different id de-projection data 403. In the example of an equirectangular projection mapping, the center of projection may be different, the solid angle of the 3D space encoded in these two pictures is different and the dynamics of the depth encoding in the depth picture may also be different. Patches may have different sizes and different shapes. On the examples of the present document, every patch is rectangular. This is only an example and, according to the projection process, patches may have any shape (e.g. an ellipse or a trapezoid). If not set by default, this information is comprised in the de-projection data.

According to the present principles, a set of patches representative of the 3D scene to encode are obtained according to any suitable method. These patches are then packed into color and depth images in order to be added to the video track of a data stream, for example according to the ISO BMFF standard. The cumulative size of color and depth pictures of patches for a 3D scene may be substantial.

Figure 5:
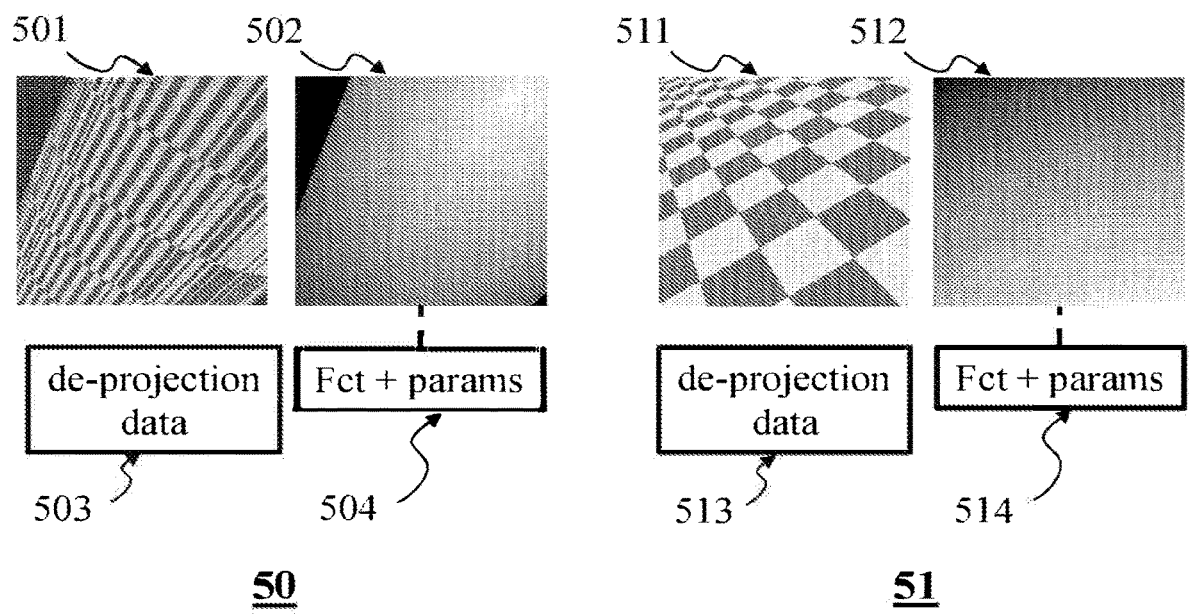
FIG. 5 shows two patches relative to the 3D scene of FIG. 2, each patch comprising a color picture, a depth picture, de-projection data and a data comprising an identifier to an analytic function and parameter values for initializing this function, according to a non-restrictive embodiment of the present principles.

FIG. 5 shows two patches relative to the 3D scene of FIG. 2, each patch comprising a color picture, a depth picture, de-projection data and a data comprising an identifier to an analytic function and parameter values for initializing this function. Patch 50 encodes a part of the 3D scene representing a cylindrical pillar. Patch 50 comprises a color picture 501 resulting of the projection of the colors of the pillar onto a projection map; a depth picture 502 encoding the distances between the projection map and the object according to the chosen projection mapping; and de-projection data 503 comprising every parameter need to retrieve the part of 3D scene from pictures. In addition (or instead of depth picture 502), patch 50 comprises a data item 504 comprising an identifier of an analytic function and parameter values to initialize the function.

A first category of parametrization falls in the group of 3D analytic shape. Typically, when a plan is found to be a good approximation for the geometry of a given patch, a set of four floating-point coefficients (a, b, c, d) may be used to advantageously replace a depth picture for the transmission of this latter geometry information. In that case, on the decoding side, the geometry of a given pixel of the patch of interest can be recovered as the intersection of the plan defined by the equation a*x+b*y+c*z+d=0 for any point (x, y, z) of the 3D space with the ray directed by the de-projection direction at this specific pixel. Alternatively, for a quadric approximation (spheroid, ellipsoid, cylinder, hyperboloid), a set of ten floating-point coefficients is required and the intersection between the surface defined by the equation a*x+b*y+c*z+d*x*y+e*x*z+f*y*z+g*x*x+h*y*y+i*z*z+j=0 with the ray directed by the de-projection direction is used in this case to recover the geometry on the client side.

A second category of parametrization falls in the group of 2D depth approximation. In that case instead of trying to approximate the geometry of the underlying 3D shape of the patch, the idea is to approximate the value of the depth for each pixel of the color patch. If one pixel is stored at pixel coordinates (a, b) then, one tries to approximate the depth as a function $f$ of (a, b). In that case a constant depth over a patch may be parametrized by a single parameter Z equal to the constant depth value over the patch for instance.

According to the present principles, a list of analytic and parametric functions is stored in memory. These functions from the 2D space of the color pictures to the 3D space of the 3D scene corresponds to simple geometrical shapes such as planes, cylinders, spheres or cubes. These functions may be parametrized to set the size, the location and the orientation of the 3D shape in the 3D space. When a depth picture is generated, the result is analyzed to determine if the geometry of the projected part of the scene can be approximate by a parametrized function of the list of known functions. Different techniques are available to perform this determination. A distance between the shape generated by a parametrized function and the geometry encoded in the depth picture may be calculated and the parametrized function may be considered as a good approximation of the geometry if this distance is smaller than a given threshold. This threshold may be determined according to the size or the location of the projected part relatively to the 3D scene and/or to the area defining the set of possible points of view. The approximation may be less accurate for small objects or objects distant to the possible points of view for example. Any suitable method to determine whether geometry encoded in a depth picture may be approximate by a parametrized analytic function may be used at this step of the present encoding method. Such patches have a geometry data (the depth picture) of the first type of a group of two geometry types.

Patch 51 of FIG. 5 comprises a color picture 511, a depth picture 512, de-projection data 513 and data representative of a parametrized analytic function 514. Data 514 comprises, for example an identifier pointing to the plane function in the list of known functions and a set of parameter values to locate and orient the plane in the 3D space. Data 514 are provided in addition to the depth picture. In a variant, data 514 are provided instead of depth picture 512. Regarding patches 40 and 41 of FIG. 4, as no parametric analytic function has been determined as a good approximation of the geometry of the projected part of the scene, only the depth picture is provided to encode this geometry. Such patches have a geometry data of the second type of the group of two geometry types.

According to the present principles, a set of patches as described in regard to FIGS. 4 and 5 is obtained. This set of patches carries data for every point of the scene that have to be encoded in the data stream as determined by the set of possible points of view.

Figure 6:
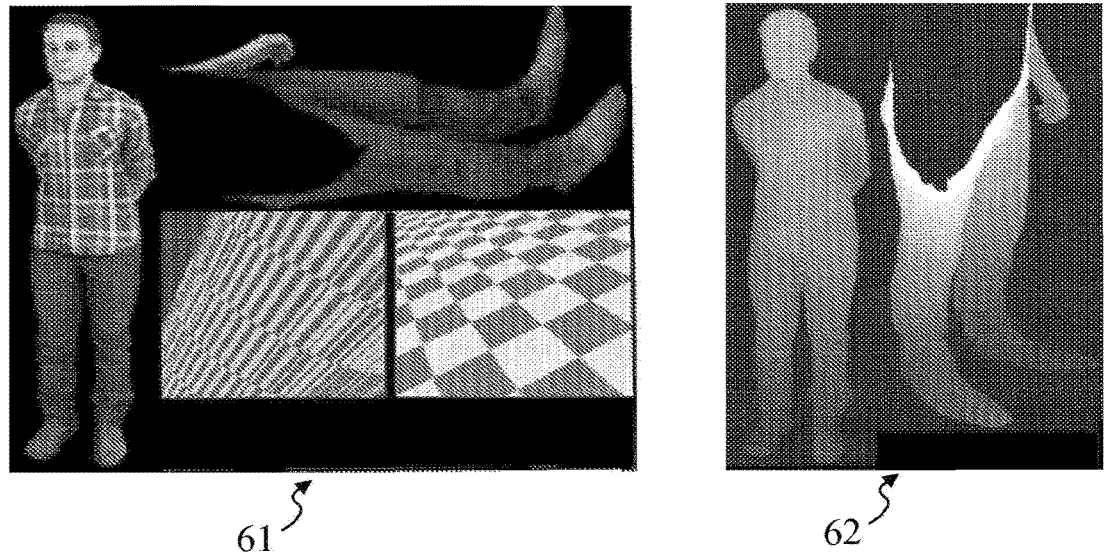
FIG. 6 illustrates packing of the obtained patches in color and depth images, according to a non-restrictive embodiment of the present principles.

FIG. 6 illustrates packing of the obtained patches in color and depth images. A packing operation is performed on every color picture obtained for a 3D scene to generate a color image 61. Numerous heuristic algorithms exist to solve the NP-complete problem of packing rectangular cells into a rectangular bin (i.e. the image to be generated), as the algorithm described in "A Thousand Ways to Pack the Bin" by Jukka Jylanki for instance or the "MaxRects" algorithm (i.e. Single Bin—Best Short Side First configuration) which provides good filling ratio at quite low computational costs. At the end of the packing operation, a location (x, y) (e.g. lower left corner position), a shape (e.g. rectangle, ellipse) and a size of the color picture in the image, and, according to the packing algorithm, a boolean value indicating whether the patch has been rotated are assigned to each patch of the patch data item list. The packing may be optimized by aligning the color pictures on Coding Units of the video encoder in order to improve the decoding stage. FIG. 6 shows a picture in which are packed color pictures of FIGS. 4 and 5.

A packing operation is performed on depth picture obtained for patches having a geometry data of the first type to generate a depth image 62. Only the depth pictures which cannot be simplified as an identifier of a known function and a list of parameters are stored in the packed depth image.

Figure 7:
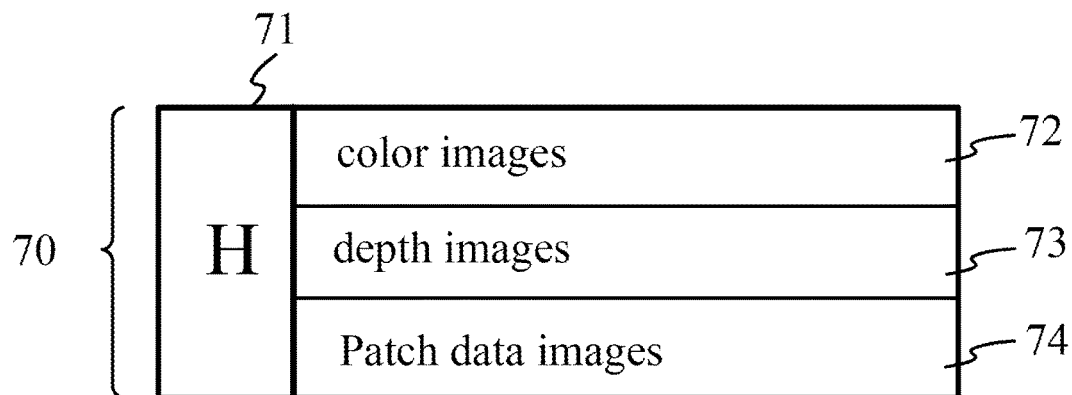
FIG. 7 shows an example of an embodiment of the syntax of a stream when the data are transmitted over a packet-based transmission protocol, according to a non-restrictive embodiment of the present principles.

FIG. 7 shows an example of an embodiment of the syntax of a stream when the data are transmitted over a packet-based transmission protocol. FIG. 7 shows an example structure 70 of a volumetric video stream. The structure consists in a container which organizes the stream in independent elements of syntax. The structure may comprise a header part 71 which is a set of data common to every syntax elements of the stream. For example, the header part comprises metadata about syntax elements, describing the nature and the role of each of them. The header part may also comprise the coordinates of the set of possible points of view used for the encoding the first color image for 6DoF rendering and information about the size and the resolution of pictures. The structure comprises a payload, also called video tracks, comprising a color picture 72 and a depth picture 73. Images may have been compressed according to a video compression method.

A third element of syntax 74 of the video track comprises a set of patch data items. A patch data item is a data structures comprising values encoded as bytes. The data structure may be compressed using any suitable method. A patch data item comprises de-projection data, a location (and optionally a shape and a size) of a color picture in the color image, and a geometry data. There are two geometry types. A geometry data of the first geometry type comprises a location (and optionally a shape and a size) of a depth picture in the depth image. A geometry data of the second geometry type comprises an identifier of a parametric function and a list of parameter values for the identified parametric function.

These three elements of syntax of the stream are associated together. According to the present principles, a stream may comprise a sequence of triplets of these data. For each color picture in the first element of syntax of the stream, a depth picture is associated with the color picture in the second element of syntax and a set of patch data items is associated with the color picture in the third element of syntax of the stream. These triplets are ordered and associated with temporal information such as a time stamp for a dynamic video rendering.

For illustration purpose, in the context of ISOBMFF file format standard, color map, depth map and the metadata would typically be referenced in ISOBMFF tracks in a box of type MOOV, with color map and depth map data themselves embedded in media-data box of type mdat.

Figure 8:
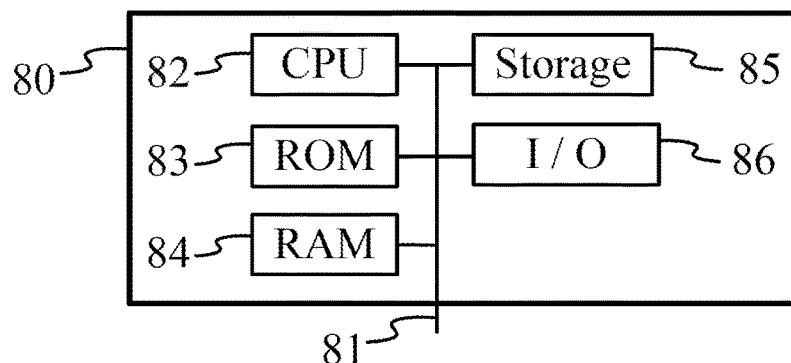
FIG. 8 shows an example architecture of a device which may be configured to implement a method described in relation with FIGS. 9 and/or 10, according to a non-restrictive embodiment of the present principles.
Figure 9:
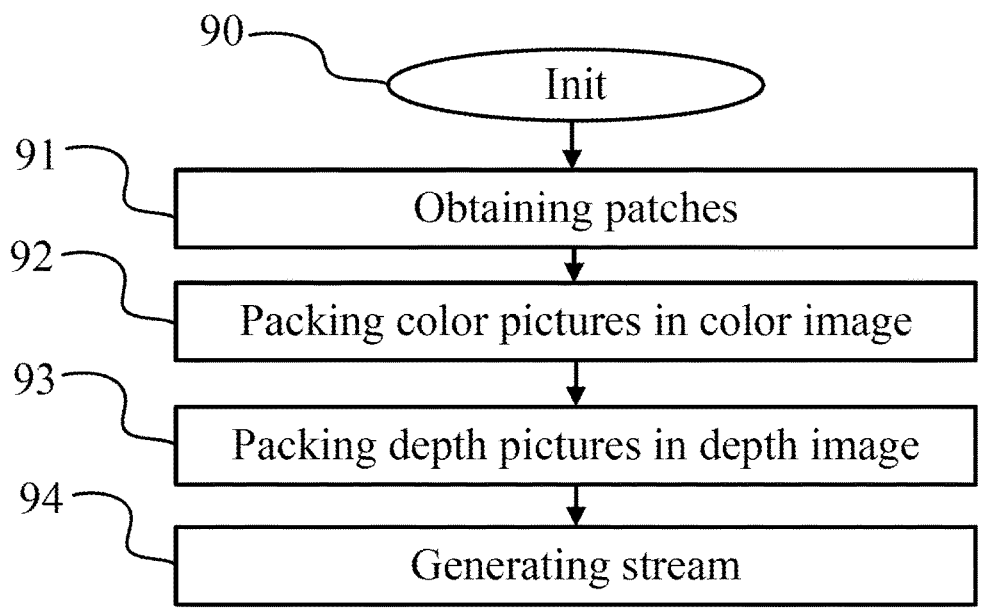
FIG. 9 illustrates a method for encoding a point cloud in a stream, in a device of FIG. 8 configured to be an encoder 31 of FIG. 3, according to a non-restrictive embodiment of the present principles.

FIG. 8 shows an example architecture of a device 80 which may be configured to implement a method described in relation with FIGS. 9 and/or 10. The device 80 may be configured to be an encoder 31 or a decoder 33 of FIG. 3.

The device 80 comprises following elements that are linked together by a data and address bus 81:
- a microprocessor 82 (or CPU), which is, for example, a DSP (or Digital Signal Processor);
- a ROM (or Read Only Memory) 83;
- a RAM (or Random Access Memory) 84;
- a storage interface 85;
- an I/O interface 86 for reception of data to transmit, from an application; and
- a power supply, e.g. a battery.

In accordance with an example, the power supply is external to the device. In each of mentioned memory, the word «register» used in the specification may correspond to area of small capacity (some bits) or to very large area (e.g. a whole program or large amount of received or decoded data). The ROM 83 comprises at least a program and parameters. The ROM 83 may store algorithms and instructions to perform techniques in accordance with present principles. When switched on, the CPU 82 uploads the program in the RAM and executes the corresponding instructions.

The RAM 84 comprises, in a register, the program executed by the CPU 82 and uploaded after switch-on of the device 80, input data in a register, intermediate data in different states of the method in a register, and other variables used for the execution of the method in a register.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with an example of encoding or an encoder 31 of FIG. 3, the three-dimensional scene 30 is obtained from a source. For example, the source belongs to a set comprising:
- a local memory (83 or 84), e.g. a video memory or a RAM (or Random Access Memory), a flash memory, a ROM (or Read Only Memory), a hard disk;
- a storage interface (85), e.g. an interface with a mass storage, a RAM, a flash memory, a ROM, an optical disc or a magnetic support;
- a communication interface (86), e.g. a wireline interface (for example a bus interface, a wide area network interface, a local area network interface) or a wireless interface (such as a IEEE 802.11 interface or a Bluetooth® interface); and a user interface such as a Graphical User Interface enabling a user to input data.

In accordance with examples of the decoding or decoder(s) 33 of FIG. 3, the stream is sent to a destination; specifically, the destination belongs to a set comprising:
- a local memory (83 or 84), e.g. a video memory or a RAM, a flash memory, a hard disk;

a storage interface (85), e.g. an interface with a mass storage, a RAM, a flash memory, a ROM, an optical disc or a magnetic support; and a communication interface (86), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi® or a Bluetooth® interface).

In accordance with examples of encoding or encoder, a bitstream comprising data representative of the volumetric scene is sent to a destination. As an example, the bitstream is stored in a local or remote memory, e.g. a video memory (84) or a RAM (84), a hard disk (83). In a variant, the bitstream is sent to a storage interface (85), e.g. an interface with a mass storage, a flash memory, ROM, an optical disc or a magnetic support and/or transmitted over a communication interface (86), e.g. an interface to a point to point link, a communication bus, a point to multipoint link or a broadcast network.

In accordance with examples of decoding or decoder or renderer 33 of FIG. 3, the bitstream is obtained from a source. Exemplarily, the bitstream is read from a local memory, e.g. a video memory (84), a RAM (84), a ROM (83), a flash memory (83) or a hard disk (83). In a variant, the bitstream is received from a storage interface (85), e.g. an interface with a mass storage, a RAM, a ROM, a flash memory, an optical disc or a magnetic support and/or received from a communication interface (85), e.g. an interface to a point to point link, a bus, a point to multipoint link or a broadcast network.

Figure 10:
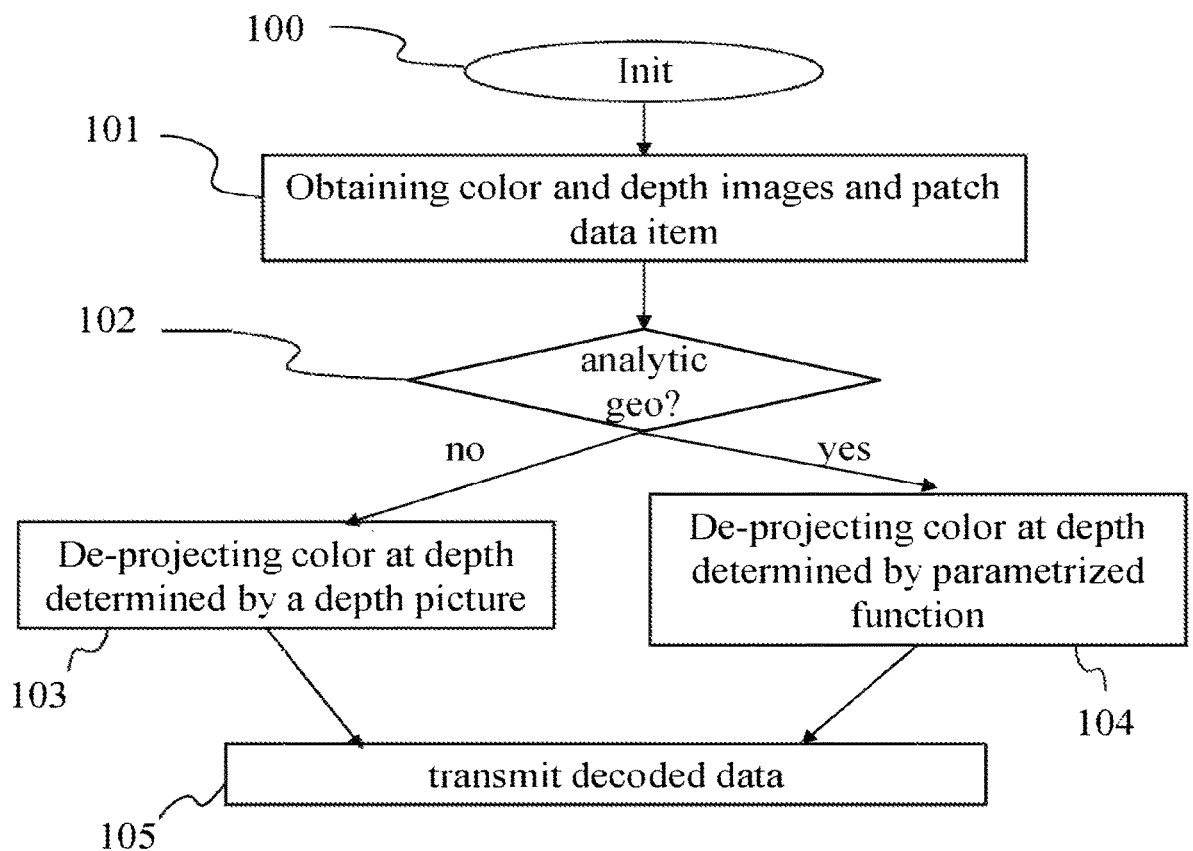
FIG. 10 illustrates a method for decoding a three-dimensional scene from a stream, in a device of FIG. 8 configured to be a device 33 of FIG. 3, according to a non-restrictive embodiment of the present principles.

In accordance with examples, the device 80 is configured to implement a method described in relation with FIG. 9 or 10, and belongs to a set comprising: a mobile device;

a communication device;

a game device;

a tablet (or tablet computer);

a laptop;

a still picture camera;

a video camera;

an encoding chip;

a server (e.g. a broadcast server, a video-on-demand server or a web server).

FIG. 9 illustrates a method for encoding a point cloud in a stream, in a device 80 (described with regard to FIG. 8) configured to be an encoder, according to a non-restrictive embodiment of the present principles.

In a step 90, the different parameters of the device 80 are updated. In particular, the 3D scene is obtained from a source, a set of possible points of view is determined in the space of the 3D scene, a projection mapping is initialized, and sizes and resolutions of the projection maps, pictures and images are determined.

In a step 91, a projection process is performed on the 3D scene in order to obtain a set of color and depth pictures representative of the part of the scene visible from every point of view of the set of possible points of view. Any suitable method may be used to obtain this set of color and depth pictures. Color and depth pictures are stored in a data structure called a patch. Data needed to perform the de-projection of the color and depth pictures are computed from the projection process parameters and stored in the patch data structure.

In a second part of step 91 or at the same time, a process is performed on each generated depth map to determine whether the geometry encoded in the depth map may be approximated by a function parametrized by a list of parameter values. A list of known functions from the 2D space of the depth pictures to the 3D space of the 3D scene is stored in memory, each function being identified by an identifier, for example an order number in the list. The approximation may be performed directly on the scalar depth values of the depth picture (scalar approximation) or on the de-projected 3D points (vectorial 3D approximation). For instance, constant, planar, spherical, cylindrical or polynomial approximation may be mentioned as approximations involving few coefficients and really likely to be found in a 3D scene (pieces of wall, of floor or of roof are often planar for example). If a good approximation is identified, then the depth picture is removed from the considered patch and geometry data comprising the identifier of the used function and the parameters values used for the best approximation are stored in the patch. In a variant, the depth picture is not removed from the patch. Before this analyse process, a patch is said being of the first type of a group of two types of geometry type. If an approximation is found for its geometry, then the patch becomes of the second type of the group.

In a step 92, a packing process is performed for every color picture of the obtained set of patches to generate a color image. Any suitable method to efficiently pack the color pictures in the color image may be used at this step. The color image is also called color patch atlas. Color pictures are arranged in the color image with a given angular resolution (e.g. 3 seconds per pixel or 5 seconds per pixel) according to the size that the projection of points of the color picture will occupy in the color patch atlas. The location of a color picture in the color image is stored in a data structure called color data. If the shape of color pictures is not set by default (e.g. a rectangle), the shape used for this color picture in the color image is stored in the color data structure. If the resolution of the color pictures packed in the color image is not constant (i.e. not the same for every color picture), the size of the color picture in the color image is stored in the color data.

In a step 93, depth pictures of patches of the first type of geometry are packed in a depth image. Only the depth pictures of patches of the first type are packed (reason why the depth picture may have been removed from the geometry data for patches of the second type of geometry). This has the advantage to save a lot of bit rate in the stream as the depth image is noticeably smaller than the color image, and noticeably smaller than a depth image in which every depth picture would be packed. An identifier and a short list of parameter values require a small number of bytes in a stream whereas, the same information encoded as a picture requires much more bytes.

In a step 94, the stream representative of the 3D scene is generated according to the structure described in relation with FIG. 7.

FIG. 10 illustrates a method for decoding a three-dimensional scene from a stream, in a device 80 (described with regard to FIG. 8) configured to be a device 33 of FIG. 3, according to a non-restrictive embodiment of the present principles.

In a step 100, the different parameters of the device 80 are updated. In particular, the stream is obtained from a source, a set of possible points of view is determined in the space of the 3D scene. In a variant, the set of possible points of view is decoded from the stream. A list of functions from the 2D space of a picture to the 3D space of the 3D scene is retrieved from a storage medium and stored in memory. In a variant, this list of functions is retrieved from the header part of the stream.

In a step 101, data representative of a 3D scene are obtained from the stream. These data comprise a color image, a depth image and a set of data structures called patch data items. A patch data item comprises de-projection data, a location (and optionally a shape and a size) of a color picture in the color image, and a geometry data. There are two geometry types. A geometry data of the first geometry type comprises a location (and optionally a shape and a size) of a depth picture in the depth image. A geometry data of the second geometry type comprises an identifier of a parametric function and a list of parameter values for the identified parametric function.

Next steps of the present method are then repeated for at least a patch data item, preferentially for each patch data item.

In a step 102, a test is performed. If the geometry data of the patch is of the first geometry type, step 103 is performed. Otherwise, if the geometry data of the patch is of the second geometry type, step 104 is performed.

In a step 103, a color picture is retrieved from the color image using the data of the color data structure; a depth picture is retrieved from the depth image using the data of the geometry data of the patch. Pixels of the color picture are de-projection by using the de-projection data at a depth calculated according to corresponding pixel in the depth picture. A part of the scene is thus decoded.

In a step 104, a color picture is retrieved from the color image using the data of the color data structure; A function is retrieved in the list of functions stored in memory according to the identifier comprised in the geometry data of the patch. The function is initialized with the associated parameters values. Pixels of the color picture are de-projection by using the de-projection data at a depth calculated according to the initialized parametric function. A part of the scene is thus decoded.

When step 103 or step 104 has been performed on each patch data item, the entire 3D scene has been decoded. In a step 105, the decoded 3D scene is transmitted to a further module, for example a renderer 35 of FIG. 3.

Naturally, the present disclosure is not limited to the embodiments previously described. In particular, the present disclosure is not limited to methods and devices for encoding/decoding a stream carrying data representative of a three-dimension scene (or a sequence of three-dimension scenes) but also extends to methods of rendering a 3D scene in a 3 degrees of freedom manner or in a volumetric manner (i.e. 3DoF+ or 6DoF) to any devices implementing these methods and notably any devices comprising at least one CPU and/or at least one GPU.

The present disclosure also relates to a method (and a device configured) for displaying images rendered from the data stream comprising the information representative of the three-dimension scene.

The present disclosure also relates to a method (and a device configured) for transmitting and/or receiving the stream encoded according to the present principles.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
   obtaining from a data stream:
      a color patch atlas packing color pictures;
      a depth patch atlas packing depth pictures corresponding to color patches of a given geometry type; and
      metadata comprising, for each color patch of the color patch atlas:
         de-projection data;
         a color data comprising a description of a location of a color picture in the color image; and
         an information indicating whether the color picture is of the given geometry type; and
         if the information indicates that the color picture is of the given geometry type, a description of a location of a depth picture in the depth patch atlas; and
         if the information indicates that the color picture is not of the given geometry type, a constant depth value; and
   for each color patch of the given geometry type:
      using de-projection data for de-projecting pixels of the color picture described by the color data at a depth value determined according to pixels of the corresponding depth patch in the depth atlas; and
   for each other color patch:
      using de-projection data for de-projecting pixels of the color picture described by the color data at the constant depth value in the associated metadata.

2. The method of claim 1, wherein a color data further comprises a description of at least one of a size or of a shape of at least one color patch in the color patch atlas.

3. The method of claim 1, wherein the data stream comprises a sequence of color patch atlases, a sequence of depth patch atlases and associated metadata, each depth patch atlas and related metadata being associated with a color patch atlas, wherein the color patch atlases are structured by temporal information.

4. A method comprising:
   obtaining a set of color patches, and, for each color patch, an information indicating whether the color patch is of a given geometry type, and if so, an associated depth patch, and if not, an associated constant depth value;
   generating a color patch atlas by packing the color patches in a color patch atlas and generating a color data comprising a description of a location of each color patch as packed in the color patch atlas;
   generating a depth patch atlas by packing depth patches associated with color patches of the given geometry type and generating first metadata comprising a description of a location of the depth patch in the depth patch atlas; and generating second metadata comprising the associated constant depth value for other color patches; and
   encoding in a data stream:
      the generated color patch atlas;
      the generated depth patch atlas; and
      for each color patch, the information indicating whether the color picture is of the given geometry type, and, if so the first metadata, and if not, the second metadata.

5. The method of claim 4, wherein a color data further comprises a description of at least one of a size or of a shape of at least one color patch in the color patch atlas.

6. The method of claim 4, wherein the data stream comprises a sequence of color patch atlases, a sequence of depth patch atlases and associated metadata, each depth patch atlas and related metadata being associated with a color patch atlas, wherein the color patch atlases are structured by temporal information.

7. A device comprising electronic circuitry adapted for:
   obtaining from a data stream:
      a color patch atlas packing color pictures;
      a depth patch atlas packing depth pictures corresponding to color patches of a given geometry type; and
      metadata comprising, for each color patch of the color patch atlas:
         de-projection data;
         a color data comprising a description of a location of a color picture in the color image; and
         an information indicating whether the color picture is of the given geometry type; and
         if the information indicates that the color picture is of the given geometry type, a description of a location of a depth picture in the depth patch atlas; and
         if the information indicates that the color picture is not of the given geometry type, a constant depth value; and
   for each color patch of the given geometry type:
      using de-projection data for de-projecting pixels of the color picture described by the color data at a depth value determined according to pixels of the corresponding depth patch in the depth atlas; and
   for each other color patch:
      using de-projection data for de-projecting pixels of the color picture described by the color data at the constant depth value in the associated metadata.

8. The device of claim 7, wherein a color data further comprises a description of at least one of a size or of a shape of at least one color patch in the color patch atlas.

9. The device of claim 7, wherein the data stream comprises a sequence of color patch atlases, a sequence of depth patch atlases and associated metadata, each depth patch atlas and related metadata being associated with a color patch atlas, wherein the color patch atlases are structured by temporal information.

10. A device comprising electronic circuitry adapted for:
   obtaining a set of color patches, and, for each color patch, an information indicating whether the color patch is of a given geometry type, and if so, an associated depth patch, and if not, an associated constant depth value;
   generating a color patch atlas by packing the color patches in a color patch atlas and generating a color data comprising a description of a location of each color patch as packed in the color patch atlas;
   generating a depth patch atlas by packing depth patches associated with color patches of the given geometry type and generating first metadata comprising a description of a location of the depth patch in the depth patch atlas; and generating second metadata comprising the associated constant depth value for other color patches; and
   encoding in a data stream:
      the generated color patch atlas;
      the generated depth patch atlas; and for each color patch, the information indicating whether the color picture is of the given geometry type, and, if so the first metadata, and if not, the second metadata.

11. The device of claim 10, wherein a color data further comprises a description of at least one of a size or of a shape of at least one color patch in the color patch atlas.

12. The device of claim 10, wherein the data stream comprises a sequence of color patch atlases, a sequence of depth patch atlases and associated metadata, each depth patch atlas and related metadata being associated with a color patch atlas, wherein the color patch atlases are structured by temporal information.

13. A non-transitory computer readable medium having stored instructions which, when executed by one or more processors, cause the one or more processors to carry out the method of claim 1.

14. A non-transitory computer readable medium having stored instructions which, when executed by one or more processors, cause the one or more processors to carry out the method of claim 4.

* * * * *